United States Patent Office 3,489,355
Patented Jan. 13, 1970

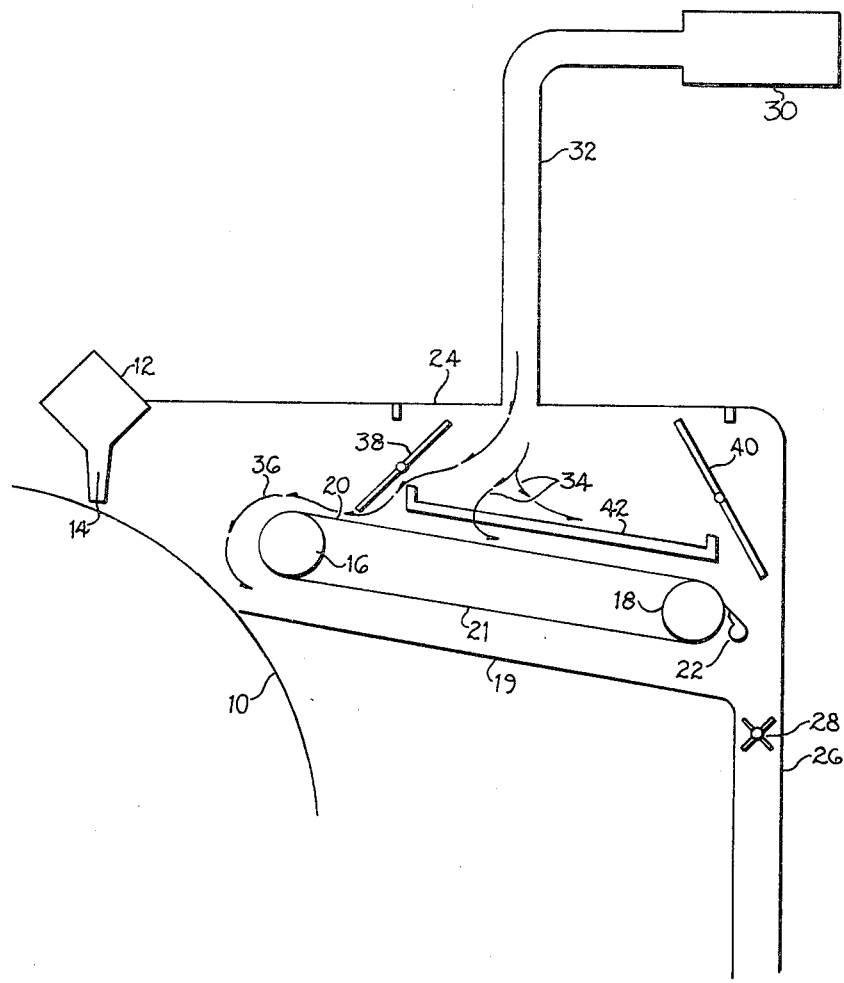

3,489,355
DEVICE FOR CONDITIONING PRODUCTS
David C. Oas, Pittsfield, George J. Neuf, Dalton, and Edward J. O'Hanrahan, Stockbridge, Mass., assignors to Beloit Corporation, Beloit, Wis., a corporation of Wisconsin
Filed Nov. 13, 1967, Ser. No. 682,445
Int. Cl. B02b 1/08, 5/02; B02c 23/02
U.S. Cl. 241—65                                  7 Claims

ABSTRACT OF THE DISCLOSURE

A device for transmitting products through a conditioned atmosphere comprising an inlet which is adjustable selectively to introduce film form products in a first condition and non-film form products in a second condition. Under the first condition, the film forming product is introduced into a conveyor means and transmitted along a path whereby it is subjected to a conditioned atmosphere. In the second condition, a second conveyor means is employed to transfer the non-film forming product through a second path in the presence of the conditioned atmosphere.

BACKGROUND OF THE INVENTION

A wide variety of products are currently being supplied to industry and to the consumer in the form of dried solids. Examples of these products are starches, gums, dried milk, powdered eggs, tomato powders, potato flakes, cake mixes, apples, pears, etc., and a wide variety of other dehydrated foods. In addition, various industrial chemicals such as synthetic polymers, fillers, pigments, dyes, and the like are prepared in a dried form. In many instances, one manufacturer will produce a wide variety of these types of products. Although the apparatus used to prepare the initial product will vary depending upon the nature of the product, it is still desirable to utilize as much of the same equipment as is possible for all of the various products being prepared. Accordingly, manufacturers have resorted to the use of one dryer for their complete line of products. Dryers are supplied with variable heat transfer means so that a wide variety of products can be efficiently dewatered with the same device.

However, one drawback which has resulted from the attempts by manufacturers to employ a single drying device is the problem of removing dried products from various drying devices. Furthermore, these products, as they are removed from the devices such as drum dryers, do not always have the optimum amount of moisture removed therefrom. Furthermore, it is necessary to subject these products as they come from drying apparatus to various conditioned atmospheres, such as, for example, when oxygen is deleterious to the product, an oxygen free atmosphere must be employed. Moreover, additional drying and/or cooling can be effected after the product has been removed from the dryers.

The present invention is therefore designed to provide the following advantages. The present invention permits the removal of dry product rapidly and continuously from drying surfaces, or other surfaces depending upon the particular process, thereby eliminating any unnecessary thermodegradation of heat sensitive products. Moreover, further dehydration and/or prevention of rewetting allows the achievement of the most desirable products characteristics. Product loss may be prevented and the system, due to its closed nature, eliminates contamination by an exterior atmosphere. In addition, the present invention allows for the collection of product from double drum dryers or multiple dryer installations at a single point.

One of the most important advantages of the present invention is that variables such as temperature, residence time of the product may be controlled to permit the handling of a wide variety of products varying characteristics without expensive alternative equipment.

Other advantages of the present invention will become apparent upon a further reading of this disclosure.

THE INVENTION

In its simplest form, the present invention comprises a device for transmitting products through a conditioned atmosphere wherein the device is adjustable selectively to a first condition wherein film forming products are transmitted through the atmosphere along a first path and a second condition wherein non-film forming products are transmitted through the atmosphere along a second path. The invention contains a supply means for supplying the conditioned atmosphere and an inlet means which again is selectively adjustable to introduce film forming products in the first condition and non-film forming products in the second condition. The film forming products introduced in the first condition are introduced through the inlet means to a first conveyor means which is adapted to transmit the film forming products from the inlet to an outlet, whereby the first path is defined. This first conveyor means is in communication with the supply means and is thereby adapted to permit association of the atmosphere with the product.

In the second condition, the inlet means transfers the non-film forming product to a second conveyor means. This second conveyor means transmits the non-film forming product from the inlet to the outlet, thereby defining the second path. This second conveyor means is also in communication with the supply means and permits association of the atmosphere with the non-film forming product.

Thus in either the first condition wherein the film forming products are treated or in the second condition when the non-film forming products are treated, the product is transferred to an outlet means which is adapted to discharge the product.

The device further contains baffle means which are adjusted to direct the conditioned atmosphere supplied by the supply means to the first conveyor means in the first condition and to a second conveyor means in the second condition of operation.

In the drawings:

The figure is a schematic drawing of an embodiment of the present invention.

In the figure, a surface 10 is shown and represents the surface from which the product is taken into the apparatus of this invention. The inlet means for introducing the product into the present invention is shown by a doctor apparatus 12 containing a doctor blade 14. As has been mentioned hereinbefore, the present device is capable of subjecting film forming products and non-film forming products to a conditioned atmosphere. In a first condition, film forming products are contained on the surface 10 and are removed by the blade 14 and are transferred to the conveyor belt 20 which is driven by drive roll 18 and positioned near the inlet by the tension roll 16. In communication with the conveyor belt 20 is a supply means 30 adapted to supply a conditioned atmosphere through duct 32. The atmosphere thus supplied is maintained in contact with the product being transmitted by the belts 20 by chamber defining walls 24.

In the first condition, baffle 38 will be in a closed position, thereby preventing flow of the conditioned air in the direction shown by arrow 36. Thus the atmosphere will take the path shown by arrow 34. Baffle means 40 is partially open to permit flow of some of the air through the impingement plate 42 to permit direct contact of the conditioned atmosphere on to the product. As the product reaches the end of belt 20, it is allowed to pass into the outlet 26. In some instances, it may be desirable to remove the product from the belt 20 by a doctor blade 22 or other device. As a further embodiment, the film forming product may be broken into pieces by a cutter device 28 after it has been conditioned by the atmosphere during the travel along belt 20.

In the second condition, non-film forming products are introduced by the doctor blade 14 and are carried by a second conveyor means to the outlet 26. This second conveyor means is shown as a chamber defined by the lower portion of the belt 21 and the wall 19 of the device. Thus the non-film forming products travel along the second path to the outlet 26. In this second condition, when the non-film forming products are introduced into the device, these non-film forming products are subjected to the conditioned atmosphere from supply means 30 through duct 32 along the path shown by arrow 36. To permit this, the baffle means 38 is adjusted to an open position and the baffle 40 is closed to prevent flow to the atmosphere along the path of arrow 34. The baffle means 40 contacts the now stationary belt 20 to completely seal off the path.

Thus it can be seen that the present invention describes an apparatus which is suitable for treating both film forming and non-film forming products, whereby these products may be subjected to a conditioned atmosphere to further dry, cool, dewater or humidify depending upon the particular nature of the product being treated. In the most efficient operation of the present device, it will most likely be desirable to recirculate the atmosphere passing through outlet 26 through various reconditioning devices (not shown) and back to supply means 30. This may be done in the conventional manner. Moreover, the product may readily be removed from the outlet 26 by the use of a cyclone separator or other device. Furthermore, the product, whether film forming or non-film forming, may be transmitted by the flow of the air as shown by either arrow 36 or arrow 34 along to a collection point for packaging or further treatment.

While one embodiment of the present invention has been described, it will become apparent that further modifications and changes may be employed without departing from the scope and spirit of the appended claims.

Having thus described the invention what is claimed is:

1. Apparatus for transmitting products through a conditioned atmosphere wherein said device is adjustable selectively to (1) a first condition wherein film forming products are transmitted through said atmosphere along a first path; and (2) a second condition wherein non-film forming products are transmitted to said atmosphere along a second path, said device comprising:
   supply means for supplying conditioned atmosphere;
   inlet means adjustable selectively to introduce film forming product into said first condition and to introduce non-film forming product in said second condition;
   first conveyor means adapted to transmit said film forming product from said inlet means to an outlet, thereby defining said first path, said first conveyor means being in communication with said supply means and adapted to permit association of said atmosphere with said product;
   second conveyor means adapted to transmit said non-film forming product from said inlet means to an outlet, thereby defining said second path, said second conveyor means being in communication with said supply means and adapted to permit association of said atmosphere with said product;
   outlet means adapted to discharge said film forming product in said first condition and to discharge said non-film forming product in said second condition; and
   baffle means adjustable selectively to direct conditioned atmosphere from said supply means to at least a part of said first conveyor means in said first condition and from said supply means to at least a part of said second conveyor means in said second condition.

2. The device of claim 1 wherein said inlet means is a doctor blade positioned in contactual relationship with a surface containing said product.

3. The device of claim 1 wherein said first conveyor means contains a tension roll, a drive roll, and a conveyor belt driven by said drive roll and positioned near said inlet means by said tension roll, whereby said belt is adapted to carry said film forming product from said inlet means to said outlet means.

4. The device of claim 3 wherein said first conveyor means further contains duct defining means enclosing said belt, said duct defining means being in communication with said supply means.

5. The device of claim 4 wherein said duct defining means contain an impingement plate positioned between said belt and said supply means.

6. The device of claim 1 wherein said outlet means contains a cutter means adapted to reduce the size of product being discharged therefrom.

7. A device for transmitting products through a conditioned atmosphere wherein said device is adjustable selectively to (1) a first condition wherein film forming products are transmitted through said atmosphere along a first path; and (2) a second condition wherein non-film forming products are transmitted through said atmosphere along a second path, said device comprising:
   supply means for supplying a conditioned atmosphere;
   first duct defining means adapted to conduct said conditioned atmosphere;
   inlet means comprising a doctor blade positioned in contactual relationship with a surface containing a product and adjustable selectively to introduce a film forming product in said first condition and to introduce a non-film forming product in said second condition;
   outlet means adapted to discharge said film forming product in said first condition and to discharge said non-film forming product in said second condition;
   first conveyor means in communication with said first duct defining means and comprising a tension roll, a drive roll and a conveyor belt driven by said drive roll and positioned near said inlet means by said tension roll, whereby said belt is adapted to carry said film forming product from said inlet to said outlet;
   second conveyor means in communication with said first duct defining means and comprising a duct which defines a path adapted to transfer said non-film forming product from said inlet to said outlet; and
   baffle means adjustable selectively to close off communication of said second conveyor means with said first duct in said first condition whereby said atmosphere is in direct communication only with said first conveyor means, and to close off communication of said first conveyor means with said first duct in said second condition whereby said first duct defining means is in communication only with said second conveyor means.

References Cited

UNITED STATES PATENTS 2,662,694　12/1953　Lotz _____ 241—65
3,116,124　12/1963　Eolkin _____ 34—36

GERALD A. DOST, Primary Examiner

U.S. Cl. X.R.

34—36; 241—62, 186